US008963355B2

(12) United States Patent
Kim

(10) Patent No.: US 8,963,355 B2
(45) Date of Patent: Feb. 24, 2015

(54) HIGH-PERFORMANCE WIND TURBINE GENERATOR THAT CAN BE DRIVEN IN HORIZONTAL/VERTICAL AXIS DIRECTIONS WITH THE USE OF 3D ACTIVE INTELLIGENT TURBINE BLADES

(76) Inventor: Joo-Soo Kim, Busan (KR)

( * ) Notice: Subject to any disclaimer, the term of this patent is extended or adjusted under 35 U.S.C. 154(b) by 170 days.

(21) Appl. No.: 13/700,215

(22) PCT Filed: Dec. 6, 2010

(86) PCT No.: PCT/KR2010/008661
§ 371 (c)(1),
(2), (4) Date: Jun. 7, 2013

(87) PCT Pub. No.: WO2011/149167
PCT Pub. Date: Dec. 1, 2011

(65) Prior Publication Data
US 2013/0241200 A1  Sep. 19, 2013

(30) Foreign Application Priority Data

May 27, 2010  (KR) .................. 10-2010-0049453

(51) Int. Cl.
  *F03D 9/00*  (2006.01)
(52) U.S. Cl.
  USPC ........................................... 290/44
(58) Field of Classification Search
  CPC ............. F03D 3/02; F03D 3/068; F03D 7/00;
  F05B 2240/40; Y02E 10/74
  USPC ............. 290/44, 55; 415/2.1, 4.1, 4.5; 416/17
  See application file for complete search history.

(56) References Cited

U.S. PATENT DOCUMENTS

| 6,543,999 | B1 | 4/2003 | Van Polen | |
|---|---|---|---|---|
| 2011/0006526 | A1* | 1/2011 | Hemmingsson | 290/44 |
| 2011/0148111 | A1* | 6/2011 | Oosterling | 290/44 |
| 2013/0189101 | A1* | 7/2013 | Coulson | 416/9 |
| 2013/0277981 | A1* | 10/2013 | Turck | 290/55 |

FOREIGN PATENT DOCUMENTS

| JP | 03-202679 A | 9/1991 |
|---|---|---|
| KR | 20-02717541 Y1 | 4/2002 |
| KR | 10-2006-0022623 A | 3/2006 |

OTHER PUBLICATIONS

"Related International Patent Application No. PCT/KR2010/008661 International Search Report", Aug. 25, 2011, Publisher: PCT, Published in: KR.

* cited by examiner

*Primary Examiner* — Julio Gonzalez
(74) *Attorney, Agent, or Firm* — Joo-Soo Kim

(57) ABSTRACT

Provided is a 3D active intelligent-type high-performance wind turbine generator. The 3D active intelligent-type high-performance wind turbine generator may be driven in horizontal/vertical axis directions. This novel wind turbine generator includes blades for driving a generator shaft of which cross sections are arranged symmetrically to increase the efficiency of the wind turbine generator and a cylindrical type cam and cam follower for controlling the angle of each blade in every direction to an optimum condition, so as to guide a working fluid having kinetic energy to be introduced at right angles to the direction of the cross section of each blade, thereby maximizing the driving force of the blades. Thus, the wind turbine generator may operate satisfactorily even at a low initial start-up wind speed and may be driven in any horizontal/vertical axis directions.

5 Claims, 23 Drawing Sheets

HIGH-PERFORMANCE WIND TURBINE GENERATOR THAT CAN BE DRIVEN IN HORIZONTAL/VERTICAL AXIS DIRECTIONS WITH THE USE OF 3D ACTIVE INTELLIGENT TURBINE BLADES

BACKGROUND OF THE INVENTION

1. Field of the Invention

The present invention relates to a 3-dimensional (3D) active intelligent-type high-performance vertical/horizontal axis wind power generator, and more particularly, to a novel wind power generator in which a blade is optimally adjusted in angle in up/down and left/right directions without having the shock and vibration by using two kinds of cylindrical type accurate cams and three kinds of accurate cam followers so that the blade for driving an axle of the generator is designed to have bilateral symmetry in section to allow a motive fluid having kinetic energy to be vertically introduced with respect to the section of the blade, thereby maximizing a driving force of the blade, and the wind power generator is well operated at a low initial start-up wind speed and in any horizontal/vertical axis directions to generate electricity.

2. Description of the Related Art

Although wind power generators using wind, which is used as green energy today, have a long history than photovoltaic power generators, high-performance/novel wind power generators are not released yet. Even though various models of wind power generators are utilized today, modified models of the Dutch windmill model are being used as commercial models for producing a large amount of electricity. However, the modified models are advanced in technique, but not advanced in concept. Existing windmill-type/horizontal axis wind power generators are being manufactured so that a blade has a diameter of about 100 m, equivalent to the height of 50-story building. A reason, in which such a large-scale blade is required, is because of the following problems. A rotation force of the blade is proportional to the cube of a wind speed and the square of a diameter thereof. Thus, to increase the rotation force of the blade, the blade should be increased in diameter. In a case of a horizontal axis windmill-type wind power generator, two vectors may occur regardless of an incidence angle of a fluid into the blade. Here, the two vectors may be largely classified into a driving vector and a wind pressure vector, i.e., one may be a driving vector which acts parallel to a rotation section of a blade according to the design of the blade to generate a rotation force, and the other one may be a vector which acts as a wind pressure in an axis direction. That is, an existing windmill-type horizontal axis generator has a structure in which a loss of a driving force for generating a rotation force essentially occurs by a pressure applied into an axis direction. The axis-directional vector corresponds to the loss of energy efficiency. Thus, to minimize the loss of the energy efficiency and maximize the rotation force, if possible, the extra-large wind power generator may be increased in sectional area of the blade and increased in diameter of the blade to overcome the reduction of the sectional area of the blade. As a result, the windmill-type horizontal axis generator may be increased in weight and production, transfer, and installation costs. Thus, a broad area for installing the generator is required. Therefore, in a method for maximizing the efficiency of the generator, it may be preferable that the driving vector, which is the first factor of the two vectors, generated parallel to the rotation section of the blade is maximized, and the wind pressure vector generated in the axis direction is minimized. However, in the Dutch windmill-type wind power generator, it may be difficult to obtain high efficiency because the energy transition efficiency reaches the ceiling. To solve the above-described problem, novel technologies are required. For this, the two core factors should be changed, i.e., it may be necessary to change (A) a shape of the blade and (b) an incidence angle between a driving axle of the blade and a fluid having kinetic energy. That is, the windmill-type blade should have the bilaterally symmetric shape, but not have an inclined sectional shape, is needed. Also, to maximize the driving vector in the given blade area, the fluid having the kinetic energy should be vertically introduced with respect to the section of the windmill-type blade. Also, when the rotation axle of the blade is perpendicular to the flow direction of the fluid, a driving torque of the rotation axle may be maximized. That is, the fluid may vertically contact the rotation axle. However, even though the system is constituted adequate for the above-described boundary condition, two bidirectional vectors may occur. That is, theoretically, a positive torque may occur at an azimuth angle of about 0 degree that is an incidence angle of a fluid to about 180 degrees (in a counterclockwise direction) that is an angle just before the fluid gets out of a rotation area of the blade, but not occur in the whole rotation area of the blade mounted on a generator. On the other hand, a negative torque may occur at an angle of about 180 degrees to about 360 degrees because the fluid reversely flows with respect to the rotation direction of the blade. That is to say, the positive torque and the negative torque may occur in both semicircular areas with respect to the axle at the same time. As a result, since the bidirectional driving torques collide with each other and thus are offset, the rotation force does not occur. However, no one was able to solve the problem. Thus, the present invention provides a method in which the blade is adjusted according to the azimuth angle in an active and intelligent method so that the negative torque is minimized. Therefore, a contact area between the sectional area of the blade and the fluid having the kinetic energy in an area in which a drag force acts may be minimized to allow the positive torque to overcome the drag force, thereby continuously rotating the blade and producing energy.

SUMMARY OF THE INVENTION

In the existing wind power generators, when en extreme wind speed occurs during change of a pitch of the blade, a rotation torque and a wind pressure applied to a system may be reduced to protect the system. Here, the adjustment of the pitch angle of the blade may be a very simple concept which can be derived by adjusting pitch angles of three blades through the same method using an oil pressure or electricity. However, since the concept to be embodied in this specification is not simple, a very accurate mechanism may be needed. According to a blade driving method reported in this specification, a generator shaft may be installed in all directions in addition to vertical/horizontal axle directions. In this specification, the vertical axis wind power generator will be described as an example.

As described above, in the two driving torques, when the blade intercepts a fluid having kinetic energy within an azimuth angle of about 180 degrees to about 360 degrees at which a traveling direction of the blade and a flow direction of the fluid are opposite to each other, a mechanism for adjusting a pitch of the blade to actively avoid the interception of the blade should be driven. The necessary conditions are as follows:

(1) The pitch angle is maintained so that a maximum output is in a positive (+) torque area.

(2) The pitch angle is maintained so that a minimum drag force is in a positive (−) torque area.

(3) A power for adjusting the pitch angle of the blade is obtained from self-kinetic energy.

(4) The driving power for adjusting a blade angle is minimized to minimize a loss of kinetic energy.

(5) A repeatable and continuous mechanism is required so that the assignments of the item (1) and the item (2) have a first cycle.

(6) A novel blade design for maximizing the driving torque of the blade is required.

(7) A design of the blade of which inertia is minimized is required to perform the item (5) for each cycle without loss of energy.

(8) A design of the blade is required so that the blade blocks shock and resonance generated in a blade angle transition area in which the blade passes through a fair wind area to enter into a headwind area or passes through the headwind area to enter into the fair area to endure strong wind having an extreme wind speed.

(9) When the items (1) and (2) are performed, a mechanism which is capable of minimizing a shock applied to the system and the blade is required.

(10) When the items (1) and (2) are performed, a mechanism which is capable of adjusting a yaw angle is required.

(11) Although the item (10) is operated when a fluid having kinetic energy flows horizontally, when the fluid flows parallel to an inclined surface on the inclined surface such as a ridge, but does not flow vertically with respect to a gravity direction, a mechanism adjusting the fluid flow so that the fluid vertically contacts a section of the blade anytime.

(12) A blade system having a dual layer or multi-layer structure may be considered to improve energy efficiency, an optimal mounting distance in which the blade and the fluid do not interfere and collide with each other should be detected, and the number of blade and a length and surface area of the blade should be calculated according to required conditions of the system.

To solve the above-described objects, a mechanism capable of actively adjusting an angle of the blade and a control system capable of adjusting a yaw angle of a shaft so that the shaft is parallel to a flow direction of a fluid are required. To satisfy the above-described item (5), a repeatedly circulating mechanism is required. Here, a cam may well satisfy the above-described item (5). A cylindrical cam and a circular plate cam may be used as the cam. Particularly, the cylindrical cam may be miniaturized to realize a simple and efficient operation. The cylindrical cam should be connected to a middle portion between the blade and the main driving shaft. However, the cylindrical cam may be moved only according to a yaw angle, but not be rotated continuously. For satisfying these necessary conditions, a cam controller shaft which can be adjusted so that a section of the blade is intercepted with a flow direction of a fluid within a main tower should be installed. Also, the cam controller shaft may provide an empty space in which a main driving shaft is rotatable. Also, the cam controller shaft may be moved along an azimuth angle of wind when the yaw angle is adjusted. When the fluid having the kinetic energy flows vertically at a predetermined angle, but does not flow horizontally, the cam controller shaft may be vertically adjusted in an up/down position to optimally intercept the fluid flowing in a 3D direction, i.e., in all up/down and left/right directions. Also, the generator may be installed on the ground, but not be installed on an upper end of the tower. In case of a shape of the blade, a turbine blade type having a bisymmetrical crescent shape, but not a wing shape of an airplane may be preferable because of high energy efficiency and structural strength. Since the structure of the blade includes a trussed structure in the shape, the blade may have a high strength and reduce costs and environmental damage when produced, transported, and installed.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A repeatedly circulating mechanism which is capable of satisfying various conditions required for the present invention may be considered as a cylindrical cam. Here, azimuth areas of ascending and descending areas of a roller of a cam follower may be respectively set to a width of about 60 degrees so that shock and vibration applied to the cam follower are minimized in a vertical height transition area within a guide route of the cam. Also, the transition area may be designed using a 8th power polynomial equation type and a cycloidal motion type to minimize the shock and vibration. In addition, two kinds of cams may be designed to maximally obtain a high-speed RPM. A cam (see FIG. 2) having a flat guide surface may be designed to have an RPM=100 by using the 8th power polynomial type, and a cured guide surface cam (see FIG. 3) may be designed to have an RPM=30 by using the cycloidal motion type. Also, the transition area may be changed in width to achieve optimal efficiency according to large-scale, middle-scale, and small-scale systems.

In the case of the large-scale system, since a width of the azimuth may be reduced in the transition area of the cam follower due to a lower RPM, a driving torque generation area may be increased relatively. However, in a case of a high-speed rotation, since a range of the azimuth in the transition area of the cam follower should be expanded to reduce the shock and resonance, and thus the driving torque generation area is decreased relatively to reduce efficiency, it may be anticipated that efficiency is further increased in the case of the middle-scale and large-scale systems.

Figure 1:
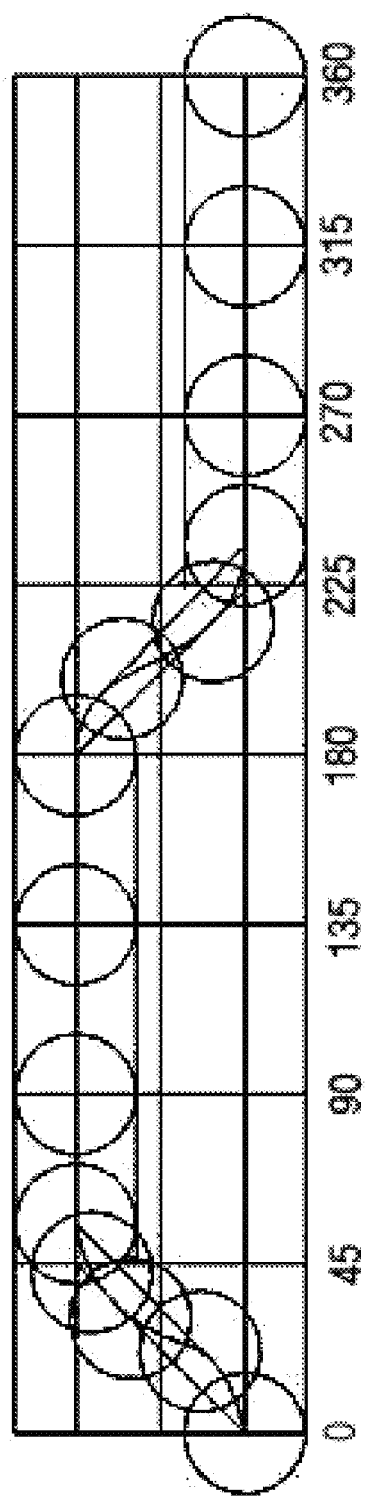
FIG. 1 is a view illustrating a change in position when a cam follower is rotated around a cylindrical cam.
Figure 2:
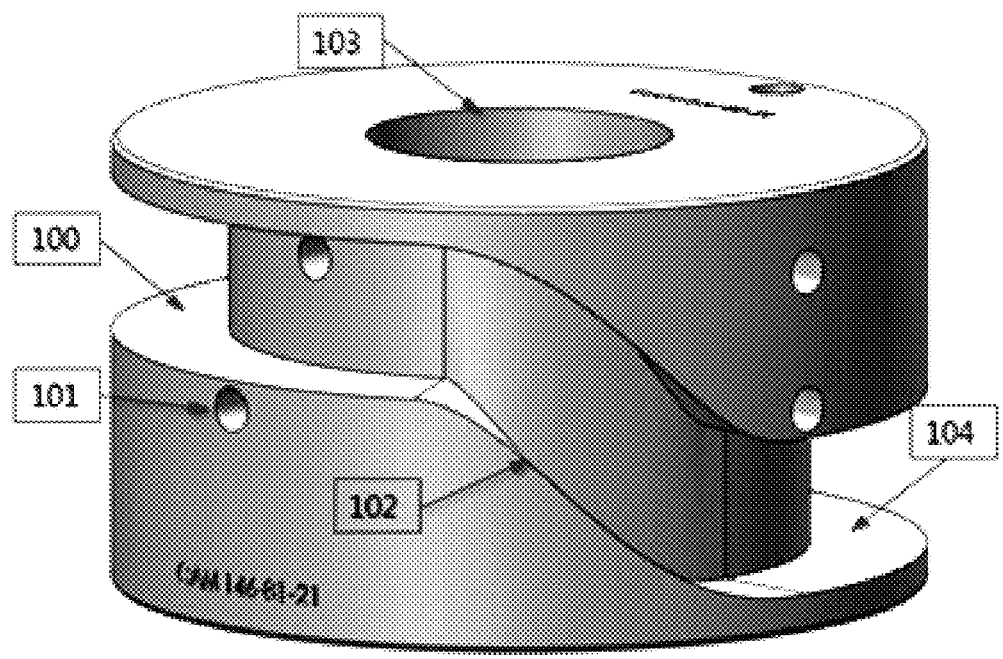
FIG. 2 is a cross-sectional view of a front portion and a central portion of an RPM=100 cylindrical cam in which a traveling guide surface for the cam follower is flat. (The illustrated cam is capable of being coupled to a fixed arm/fixed roller type cam follower (see FIG. 5))
Figure 3:
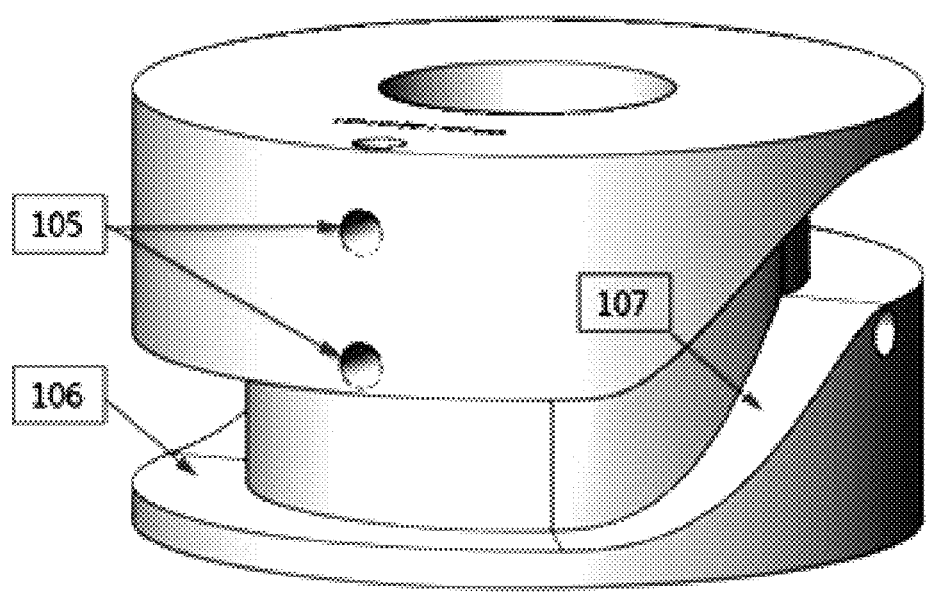
FIG. 3 is cross-sectional view illustrating an RPM=30 cylindrical cam which is designed to have a rounded groove so that a traveling guide surface of the cam surrounds a roller of the cam follower. (The illustrated cam is capable of being coupled to a fixed arm/moving spline roller type cam follower (see FIG. 6) or a moving arm/fixed roller type cam follower (see FIG. 7))
Figure 13:
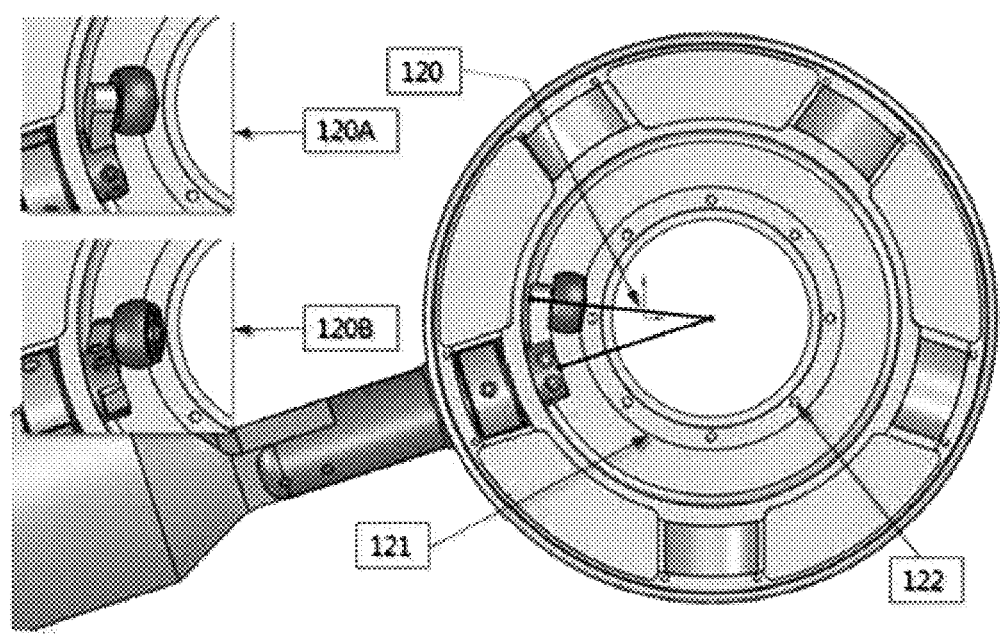
FIG. 13 is a view illustrating a change in circumference position of the cam follower with respect to a center of the housing when the cam follower is installed within the housing and moved within the cam and a change in angle at upper and lower positions when a center of the cam follower is moved toward the center of the control system housing.

In FIG. 2, a traveling azimuth of an upper area 100 and a lower area 104 on which a cam roller travels may be set to an angle of about 120 degrees, and a descent 120 may be set to an angle of about 60 degrees, like an ascent opposite to the descent 120. A hole 103 of the cam in which a control axle to be used as a yaw adjustment function is inserted may be designed to about 55 mm. Also, eight holes in which bolts for fixing the control axle are inserted may be secured to adjust the control axle at desired angle and height to intercept blowing wind at an optimal angle. FIG. 3 is a view of a high-precise/non-vibration cam which significantly reduces the shock and vibration applied to the cam of FIG. 2. Like FIG. 2, to minimize the vibration and shock, a clearance of the traveling guide surface around the cam on which the spherical roller travels may have a gap of about 0.2 mm. Also, a lubricant may be filled into the gap to reduce friction. The curved traveling guide surfaces 105 and 106 on which the roller travels may have a diameter of about 35 mm, and the roller may have a diameter of about 34.8 mm (see FIG. 5). The most important condition in the design of the curved surfaces 105 and 106 is that the curved guide surfaces have the same distance from a central axis of the can. This is done for a reason in which, when the cam follower is moved along the guide surface in the cam housing, a hinge-type arm, but not a fixed-type arm should be used. The reason in which the hinge-type cam should be used is, as shown in FIG. 13, because a central extension line of the roller axle meets a center of the cam axle only when an central axle of the roller of the cam follower is perpendicular to the cam axle, and the arm is tilted when the blade is perpendicular to a direction of the driving force and is parallel to a drag avoid direction. This may means that the extension line of the central axle of the roller does not meet the central axle of the cam, and also cause a result in which a roller ball is slid along the guide surfaces of the cam. The friction caused by the sliding may be minimized using the lubricant. A transmission oil for vehicle may be used as the lubricant.

Figure 4:
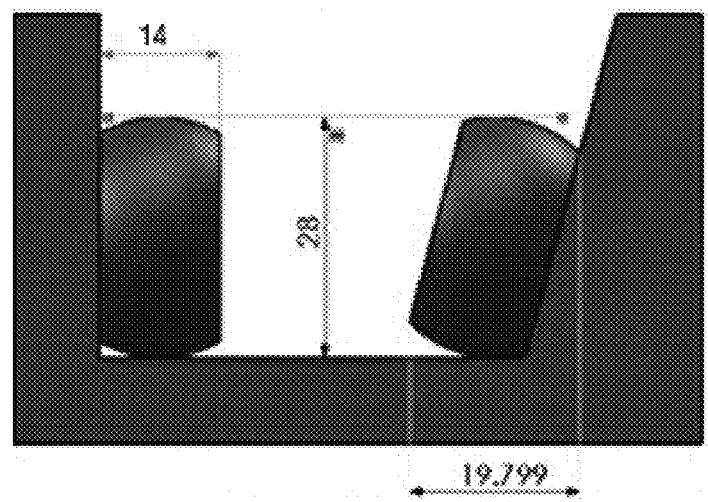
FIG. 4 is a view of a spherical cam follower which is manufactured by cutting a circular hole having a constant diameter in any direction contact top and bottom surfaces of the traveling guide surface at any position and any angle within the traveling guide surface and continuously contacts the traveling guide surface to prevent shock and vibration from being applied to the cam follower.

FIG. 4 is a view illustrating a reason in which the spherical roller should be used. When the cam roller travels the groove of the curved guide surface of the cam, the cam roller has an inclined angle of about 15 degrees between an upper traveling area and a lower traveling area. In this case, to prevent a tolerance from being generated within the groove of the curved guide surface of the cam, only the spherical roller except the cylindrical roller may be used. This is done because a contact radius of the roller is maintained to about 34.8 even when the spherical roller stands vertically up or is inclined at an angle of about 15 degrees. A groove in which a bearing is inserted may be secured inside the roller.

Figure 5:
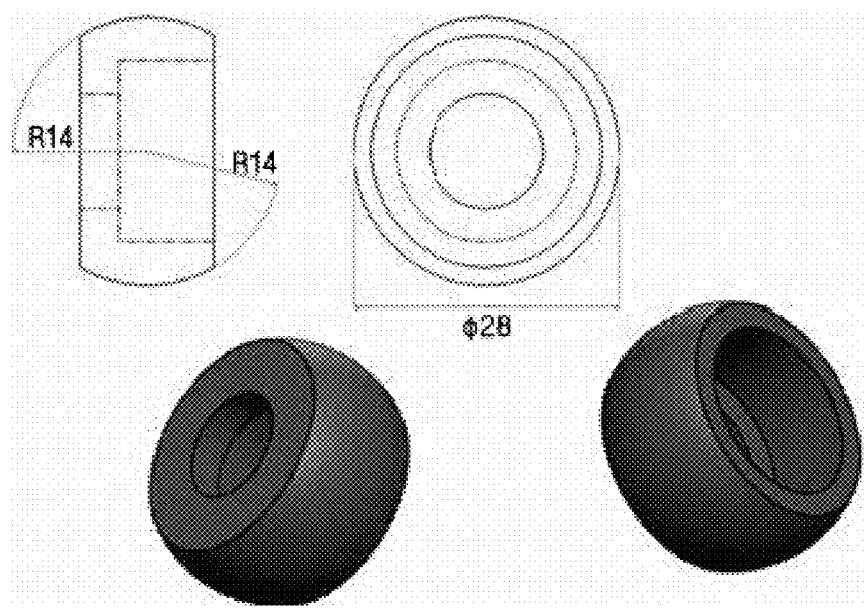
FIG. 5 is an exploded view of a high-precise non-vibration cam follower type 1 using a fixed arm/fixed roller.

Also, in a blade follower type 1 using a fixed arm/fixed roller of FIG. 5 linked with the roller, a groove 108 connected to the blade and two positions 110A at which bearings for supporting the blade are located are defined in a surface of a connection shaft. The reason in which the bearing is inserted into a right end is because the bearings are easily inserted into and separated from a lower control system housing 116H of FIG. 10 to repair the bearing. Also, when the two bearings are inserted into the control system housing and a link part 100A is fitted, and then two semicircular coupling rings 110 are fitted into a groove of the link part 110 to fix the two semicircular coupling rings 110 using a screw 110B, both sectional surfaces of the coupling rings 110 may be closely attached to the two bearings. Then, the turbine blade connection shaft may be mounted on the housing. An arm 110E has a curvature less than that of a wall so that the arm 110E touches an inner wall of the control system housing. Also, a roller 110C may be fitted into a part 111 to fix a snap ring 110D. Here, the bearings may be in the state coupled within the roller 110C. The cam follower type 1 may be used together with the cam of FIG. 2, but not be coupled to the cam of FIG. 3. In a case where the cam follower type 1 is coupled to the cam of FIG. 2, two fine points on the spherical roller may contact the traveling guide surface of the cam. Thus, a pressure may be concentrated into the two points to cause the reduction of a life cycle of the roller or a cam guide path surface (Cf. a globule contacts a plane). To solve these problems, it may be necessary that the curved surface of the spherical roller three-dimensionally contacts the can, but does not surface-contact the cam. For this, a cam model in which the traveling guide surface has a rounded surface as shown in FIG. 3. The cam of FIG. 3 may be changed accompanying with an angle of the arm of the cam follower as the azimuth of the cam is changed because a tolerance between the cam and the spherical roller has a distance of only about 0.2 mm (here, the angle represents an angle between the groove 108 and a blade coupling part 112 and the connection portion of the arm). The arm of the cam follower may adopt a spline 113D or a hinge 114C while satisfying the above-described conditions.

Figure 6:
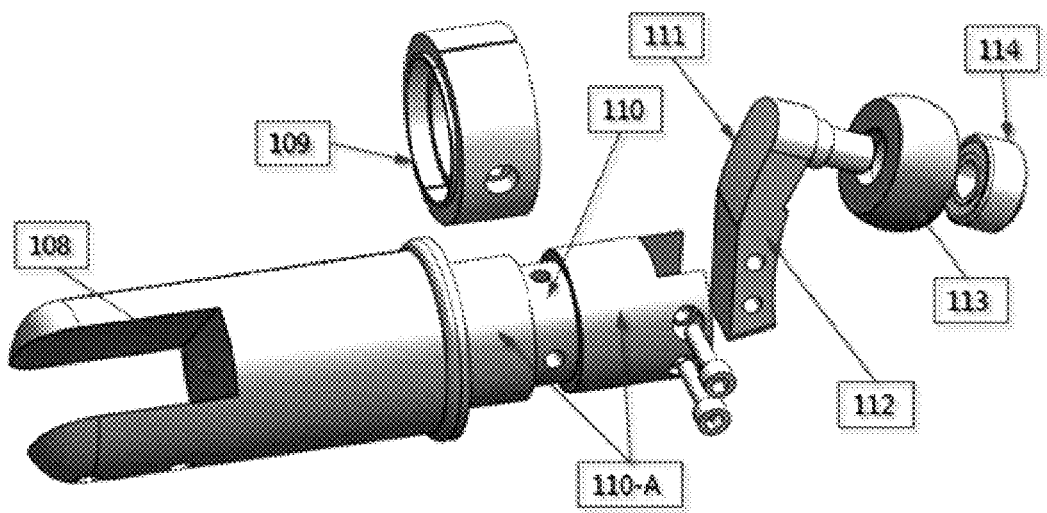
FIG. 6 is an exploded view of a high-precise non-vibration cam follower type 2 using a fixed arm/spline roller.

FIG. 6 is an exploded view of a high-precise non-vibration cam follower type 2 using a fixed arm/spline roller. A turbine blade is mounted on a left portion of a blade coupling part 112, and the two bearings 113h are disposed on a part 113A. Here, a part 113B represents a coupling screw, and a part 113C represents the arm. Also, the part 113D may be the spline for moving the spherical roller 113E toward an axle direction of the roller. Also, a part 113F may be a snap ring for preventing the spline from being separated. Here, a reason in which the spline is used is because the spline smoothly receives the tolerance and is smoothly operated as a distance between the arm and the cam is changed according to a change of the rotation angle due to the azimuth of the cam follower.

The cam follower type 2 model may be suitable for a large-scale wind power generator or a bulb unit to which a greater wind or water pressure is applied. On the other hand, the cam follower type 1 model may be suitable for a small-sized wind power generation system.

Figure 7:
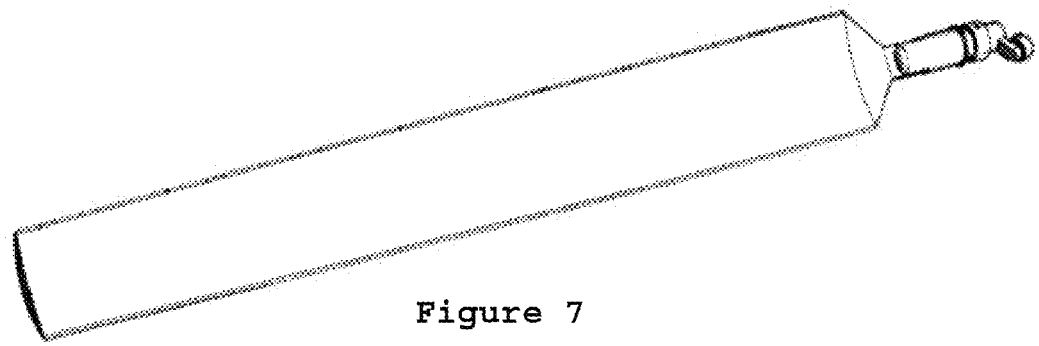
FIG. 7 is an exploded view of a high-precise non-vibration cam follower type 3 using a moving arm/fixed roller.

FIG. 7 is an exploded view of a high-precise non-vibration cam follower type 3 using a moving arm/fixed roller. This model includes a part 114B on which a blade coupling axle 114A and the bearing are disposed, the hinge 114C, a metal bearing 114E receiving an arm 114D and the hinge 114C and reducing a friction force, the snap ring 114F for fixing the part 114B and the metal bearing 114E, and bearing lockers 114J that are main parts for fixing the link part 114A to prevent the link part 114A from being separated with the bearing 114D for receiving the roller, a spherical roller 114H, and two bearing 114K therebetween. This model may be very suitable for small, middle, and large-scale wind power generators or the bulb unit. A lower portion of FIG. 7 illustrates a state in which all parts are coupled to each other.

Figure 8:
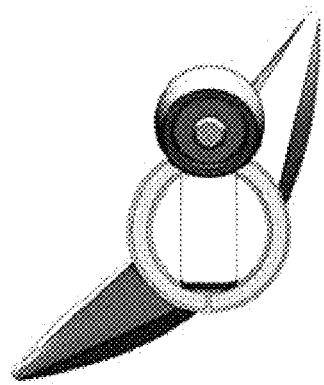
FIG. 8 is a view of a blade on which the moving arm/fixed roller is mounted when viewed from an inclined surface.

A blade of FIG. 8 is designed in a crescent shape that is a structure capable of intercepting a large amount of wind and enduring a wind pressure. Thus, the blade may naturalistically have a triangularly trussed structure. Also, the blade may have a curvature to be symmetrical with respect to a center thereof. Also, the blade may have superior strength without providing a frame therein. As a result, the blade is fundamentally different in design from a blade of an existing horizontal-type wind power generator. Also, the sectional area of the turbine may vertically contact introduced wind to significantly improve efficiency. Due to the different points, the blade shape may be superior in efficiency than an existing wind shape.

Figure 9:
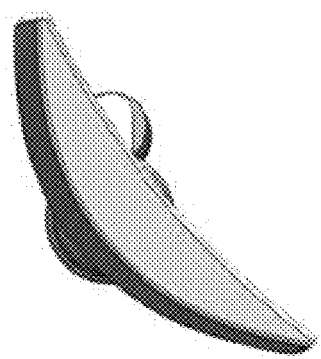
FIG. 9 is a view of the blade and the cam follower when viewed from both outsides.

FIG. 9 is a view illustrating the blade when viewed from a side of the roller and an end of the blade.

Figure 10:
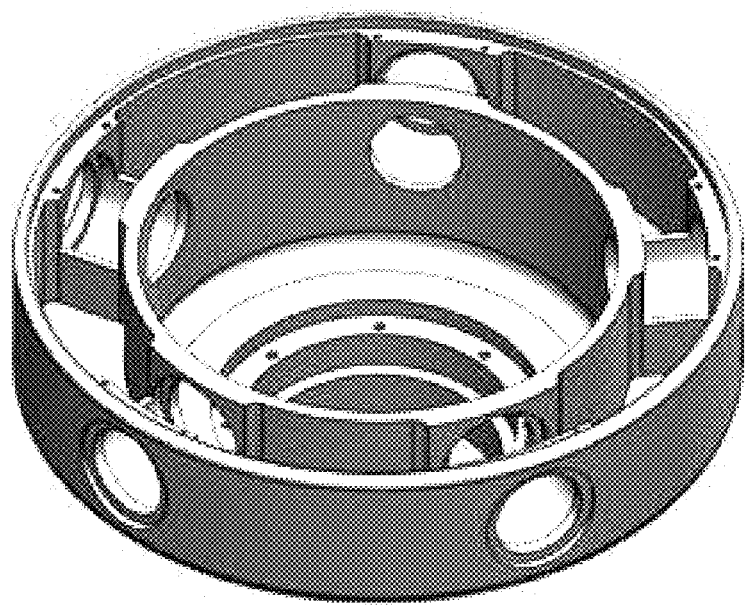
FIG. 10 is a view of a lower control system housing in which the cylindrical cam, the cam follower, and a lower blade group are installed and a cover of the housing.

FIG. 10 is a view illustrating a lower cam housing and a cover of the lower cam housing. A part 115A may be a cylinder having a state in which a semicircle in which the cam follower is inserted is cut. Bearings 109, 113H, and 114K are disposed on both sides of the cylinder. Also, the housing may receive blade coupling parts 108, 112, and 114A which are link parts for liking the blade with the arm. Here, five blades may be received into each of the housings. If the housings are provided in even number, the blades are symmetrical to each other. Thus, two rollers within the cam pass through the ascending and descending areas at the same time to increase torsion stress. On the other hand, if the housings are provided in odd number, the blades are nonsymmetrical to each other. Thus, the rollers do not pass through the transition area at the same time to reduce the vibration. As a result, the housings may be provided in odd number. Also, since a torque is generated in only a semicircular area on the basis of characteristics of the vertical axle driving blade, five blade may be provided so that at least two blades are constantly disposed in the torque generation area. A part 115B and a part 115I may be engaged with each other to securely transmit a driving force transmitted from the blades and reduce the torsion stress applied into a coupling screw 115G. A bearing for maintaining position of a main tower and the lower housing is inserted into a passage 115D in which the cam follower is inserted through a part 115H. Also, a locker for fixing the bearing is disposed on a part 115C. A bearing for supporting the control axle is disposed on a part 115E, and a part 115F is a hole through which a bolt for coupling an upper cam housing is inserted.

Figure 11:
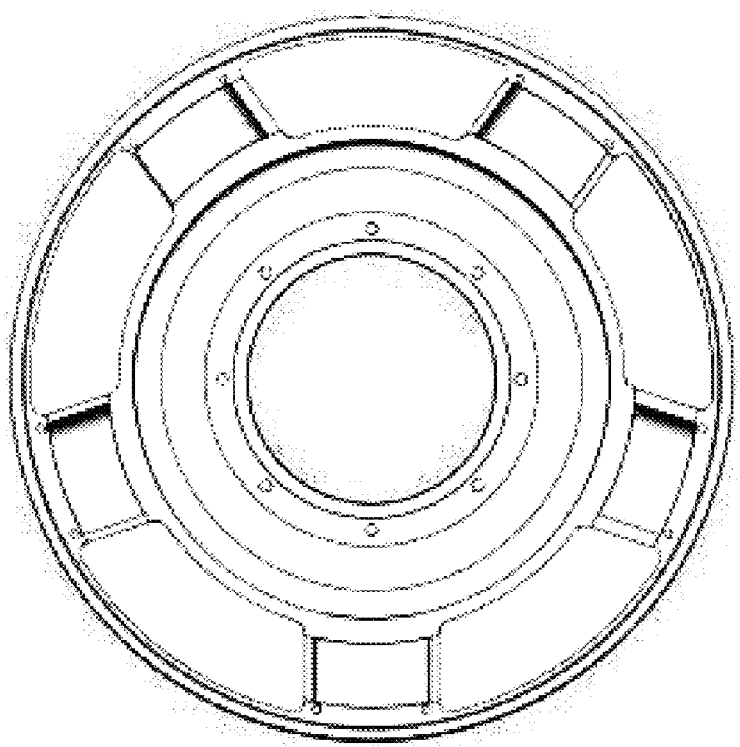
FIG. 11 is a view of an upper control system housing in which the cylindrical cam, the cam follower, and an upper blade group are installed and a lower end cover of the housing.

FIG. 11 is a view illustrating a housing of an upper control system when viewed from an lower side. Unlike the lower housing, a bolt is inserted into a part 116A to couple the upper housing to the lower housing, and a bearing is inserted into a part 116B to guide a vertical motion of the control axle. Also, a bearing locker is inserted into a part 116D, and a link device for connecting the generator to a driving force of the housing is coupled to a part 116C.

Figure 12:
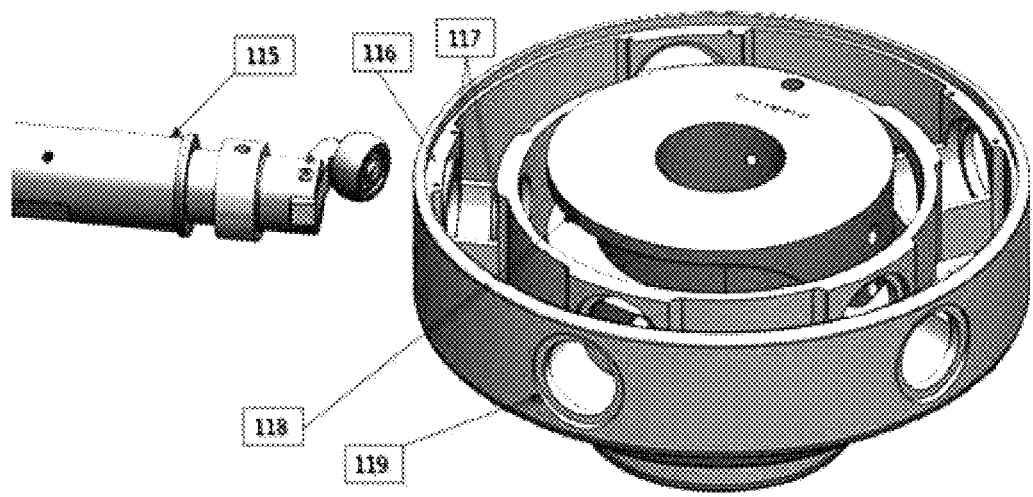
FIG. 12 is a view of a portion of the blade, a control system case, and the cam which are separated from each other.

In FIG. 12, a fixing ring 117C is disposed after the blade 117A is inserted between the two bearings 117H. Also, a cam 117F adjusts the cam follower connected to installation grooves of the five blades. A part 117B is a main part for connecting the blade to the cam and is formed of a material having a high strength. Also, it may be required that each of an arm 117D and a spherical roller 117E has a high strength. A part 118 is a bolt tap hole for coupling the cam to the control axle.

FIG. 13 is a view illustrating three states of an angle of the arm when an extension line of a driving axle 119B of a roller of a cam follower type 3 meets and does not meet an extension line of an axle 119C of the blade and a center of a side of the control system housing. Here, the upper pop-up photograph illustrates a state in which the roller is away from a circular center of a part A, and an extension line of an axle center of the roller does not meet the central axis of the cam. In this case, the turbine may be disposed in a direction in which a wind pressure is applied. The main photograph is a photograph when the turbine passes through an exact center for transition. Here, it may be seen that an extension line of a driving axle 119B of the roller exactly meets the extension line of the axle 119C of the blade and the center of the side of the control system housing. In the cam follower types 1 and 2, the angle of the arm is fixed to constantly maintain the above-described phenomenon. Thus, the sliding does not occur on the traveling guide surface of the cam to reduce the friction. The parts 119A, 121, and 122 may define the same circular. The lower pop-up photograph is an angle photograph of the arm when the blade is rotated into a drag avoid area. Here, the angle may have a shape exactly corresponding to that of the cam within the housing. Thus, the spherical roller should include a hinge so that an angle of the arm is changed when linked with the cam model of FIG. 3. These phenomenon may be core information for determining one of the cam follower types 1, 2, and 33 and realizing the high-precise/non-vibration cam.

Figure 14:
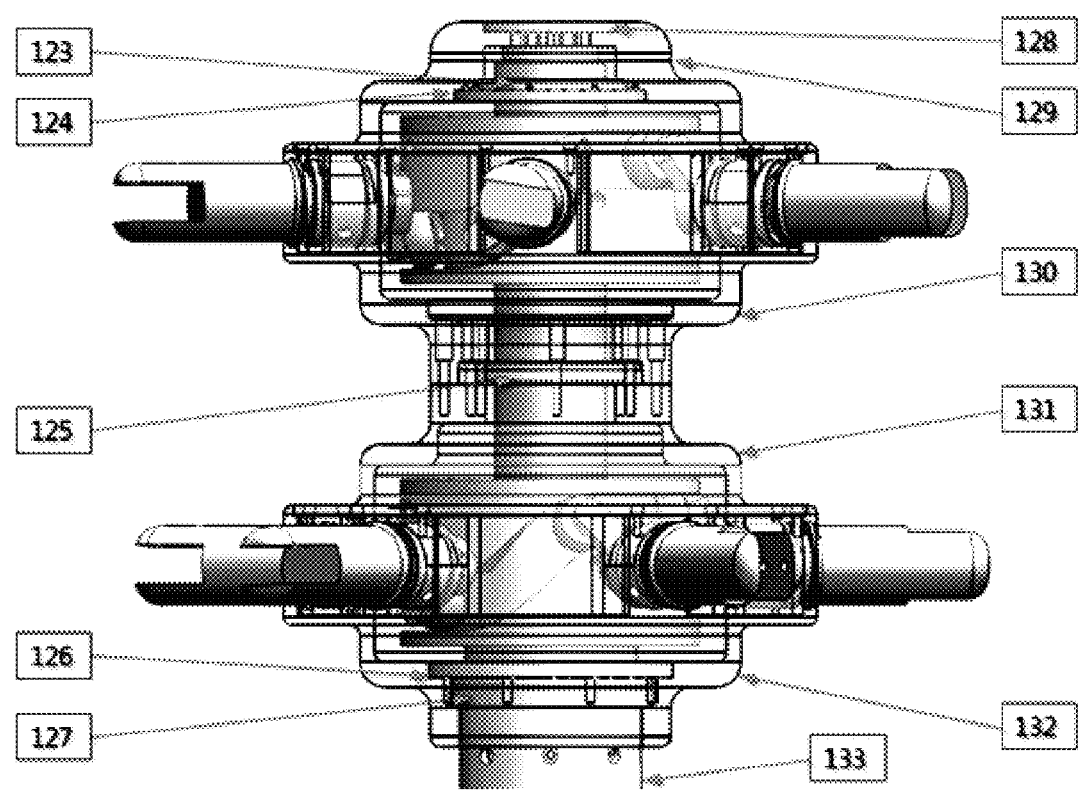
FIG. 14 is a perspective view of upper and lower control system housings constituted by a dual drive blade layers system.

FIG. 14 illustrates blue colors 123, 125A, and 127 of a central axle for easily explaining an inner structure by removing the blade and displaying a transparent control case. Here, the blue colors 123, 125A, and 127 represent bearings. A part 124 is a locker of the bearing 123, and a part 125 is a locker of the bearing 125A. Also, the part 125A is a bearing for supporting a position of a portion coupled with two cam housing therebetween. The bearing 127 is a bearing for supporting a main tower and a lower cam housing. A roller bearing for supporting a weight of an upper portion may be used as the bearing 127. A part 128 is a port for transmitting the driving force transmitted from the cam housings into a drive axle. A part 129 is a cover of an upper housing, and a part 130 is the upper housing. Also, a part 131 is a cover of a lower housing, and a part 132 is the lower housing. A part 133 is the main tower. The above-described two housings are supported by the main tower 133 and the drive axle 166.

Figure 15:
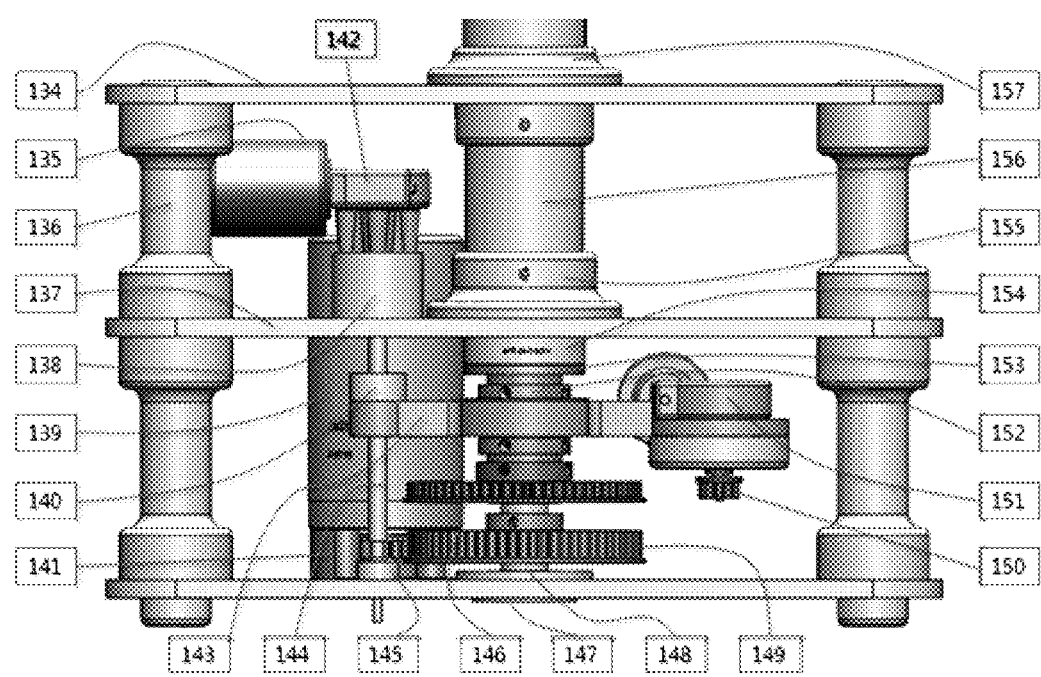
FIG. 15 is a view illustrating a system base for detailedly explaining a yaw angle control system disposed on a lower end of the system and a height adjustment device of a control axis drive.

FIG. 15 illustrates a lower mechanism of the system. Here, three sheets of base panels (134, 137, and the lowermost panel) may be used as a lower support device for supporting an experimental product of the present invention. A part 135 is a first warm gear motor for controlling a vertical motion of the control axle 158 coupled to the cylindrical cam. The first warm gear motor includes a warm gear 142. A part 136 is eight upper/lower support pillars. Also, each of connection portions of the eight upper/lower support pillars is designed in a wide circular plate shape to prevent the three sheets of panels from being twisted. A part 138 is a connection cylinder for connecting the first warm gear motor 135 to a lead screw assembly. The lead screw assembly includes a lead screw 144 of which an upper end is connected to and linked with the first warm gear motor 135 within the connection cylinder 138 and a lower end supported by a thrust bearing 145 and a cylinder 140 including a female screw engaged with a male screw of the lead screw 144 so that the lead screw 144 is vertically moved along an axle direction of the lead screw 144 when the lead screw 144 is forwardly/reversely rotated by the warm gear motor 135. The lower end of the lead screw 144 is rotated and supported by the thrust bearing 145.

A part 143 is a transporter having a central portion with two bearing for receiving and supporting the control axle 158, one end receiving the cylinder 140 and coupled to the cylinder 140, and the other end on which the warm gear motor 151 including a warm gear motor pulley 150 is installed. Here, the warm gear motor pulley 150 may be connected to a yaw horizontal adjustment pulley 146 fixed to the control axle by a belt (not shown).

The vertical motion of the control axle is connected to a pitch motion of the blade linked with the cylindrical cam. That is, when the first warm gear motor 135 is operated to forwardly/reversely rotate the lead screw 144, the cylinder 140 may be vertically moved in an axle direction of the lead screw 144. Here, the transporter receiving the cylinder 140 and coupled to the cylinder 140 may also be vertically moved. The vertical motion of the transporter may be linked again with the vertical motion of the control axle to vertically move the cylindrical cam fixed to the control axle. Finally, the vertical motion of the cylindrical cam generates a pitch motion of the blade connected to the cylindrical cam using the cam follower as a medium. Thus, when the control axle is vertically moved to allow wind to flow inclinedly, but not horizontally, a direction of the wind and an angle of the blade may match each other.

A part 151 is a second warm gear motor for electrically controlling a yaw angle, and a part 150 is a pulley of the second warm gear motor 151 for adjusting the yaw angle using the control axle. The pulley 150 may be linked with the yaw horizontal adjustment pulley installed on the lower end of the control axle using a yaw adjustment belt (not shown) as a medium. Here, the warm gear 150 may prevent a counter torque due to the cylindrical cam coupled to the control axle 158 of the blade from occurring. That is, when the cam follower is disposed on the inclined portion (see reference numeral 106 of FIG. 3) of the traveling guide surface of the control cam, the blade may receive wind in a front direction thereof. Thus, a contact pressure by the cam follower in the rotation direction (a horizontal direction of FIG. 14) of the blade may occur at a contact position between the cam follower and the inclined portion. The contact pressure may be divided into two partial pressures, i.e., a partial pressure in an inclined direction of the traveling guide surface of the cylindrical cam and a partial pressure in a direction perpendicular to that of the bottom with respect to the inclined portion. Here, the partial pressure in the direction perpendicular to that of the bottom with respect to the inclined portion may generate a force for rotating the cylindrical cam in the rotation direction of the blade. As described above, when the cam follower is rotated in the same direction as the blade by the partial pressure in the direction perpendicular to that of the bottom, it may be difficult to travel along the traveling guide surface disposed on the cylindrical cam of the cam follower. That is, when the cam follower travels along the traveling guide surface in a state where the cylindrical cam is fixed, the blade may be easily rotated in the axle direction of the blade.

A part 139 is a permanent magnet-type generator. A pulley disposed on an axle of the generator is disposed on a lower end of the part 139. The pulley is linked with a timing belt pulley 149 disposed on a lower end of the drive axle 148 receiving a driving torque from the blade using a rotation driving force transmission belt (not shown) of the drive axle 148 as a medium. The rotation transmission structure of the pulleys using the belts as the media may have advantages in which lubricant is not required, and noise does not occur. A part 147 is a part for supporting the thrust bearing of the drive axle 148. A part 141 is a support member for supporting the pulleys so that the pulley of the generator and the timing belt pulley 149 connected to the drive axle 148 are disposed at the same height with respect to the bottom surface.

A part 152 serves as a fixing part such as a part to which the bearing within the transporter 143 is attached in an opposite direction. A part 153 is a disk for blocking one surface of the sliding bearing within a part 154 and is fixed to the part 154. The part 154 is coupled to the inside of a lower side of the main tower 156 and also is coupled to a lower end support 155 of the main tower 156 and the intermediate panel 137. A part 157 is a ring for fixing the main tower 156 and is coupled to the panel 134.

Figure 16:
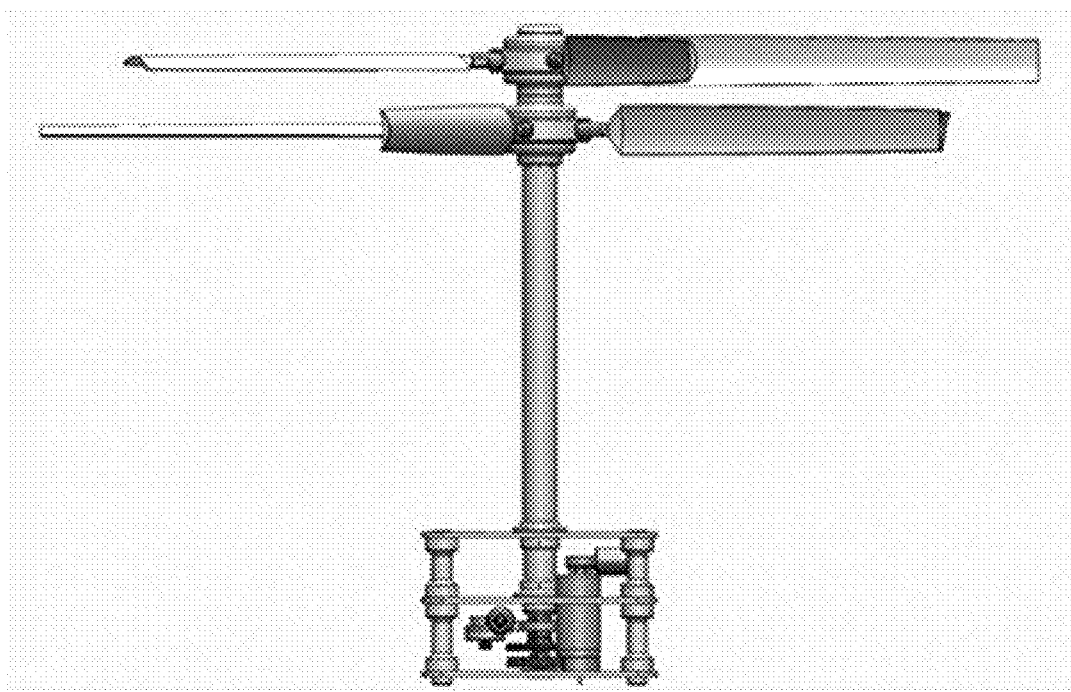
FIG. 16 is a view of a system in which the moving arm/fixed roller and the cam having the rounded groove guide surface are adopted when viewed from a front surface.
Figure 17:
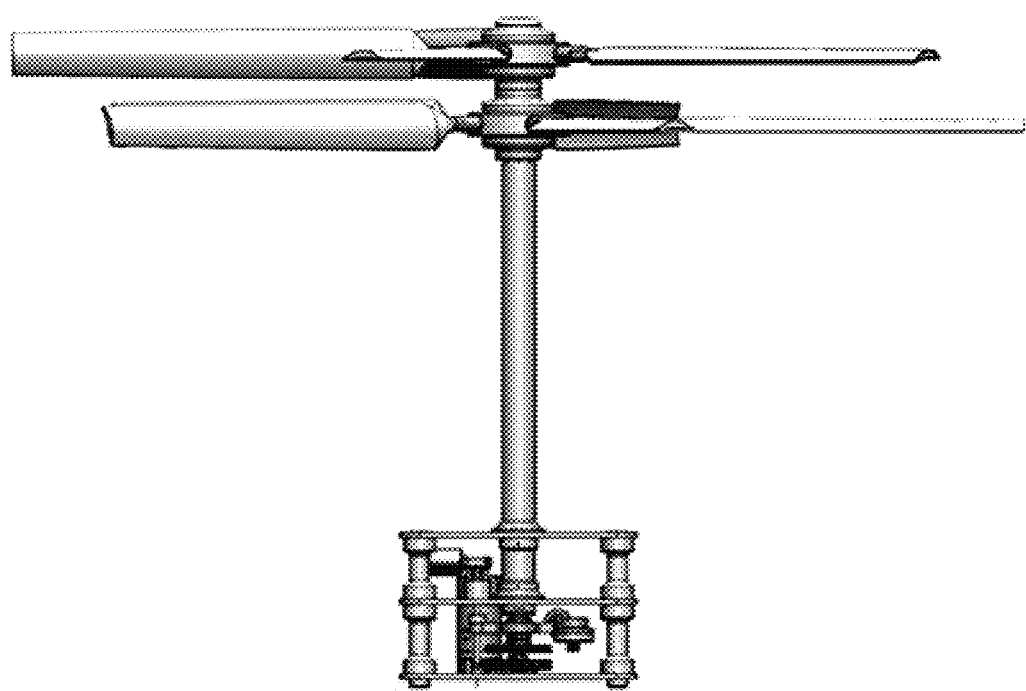
FIG. 17 is a view of a system in which the moving arm/fixed roller and the cam having the rounded groove guide surface are adopted when viewed from a rear surface.
Figure 18:
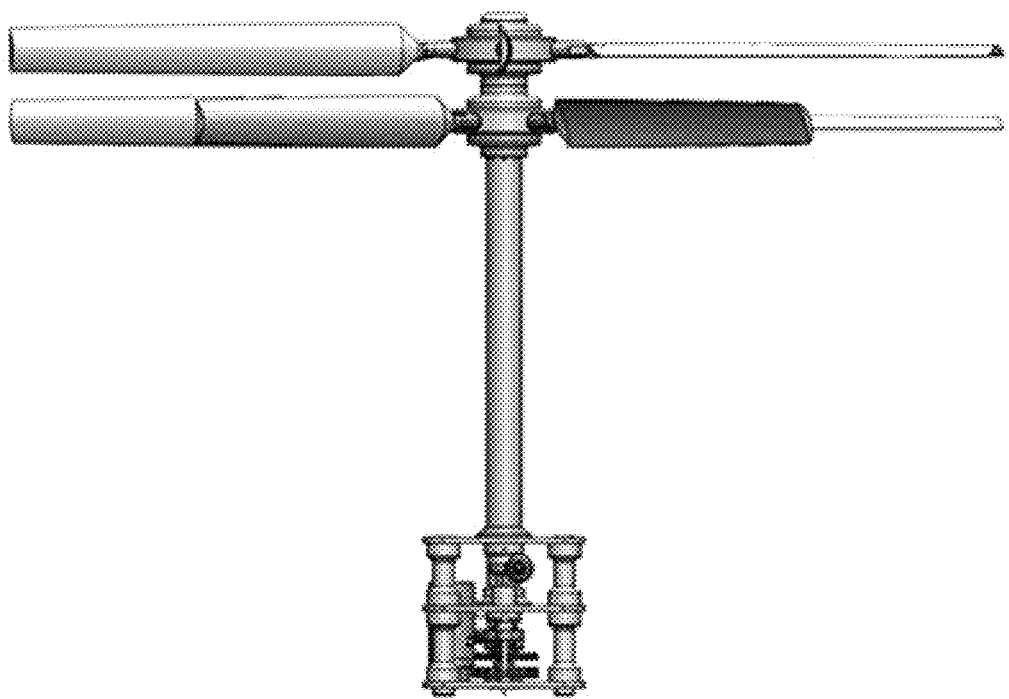
FIG. 18 is a view of a system in which the moving arm/fixed roller and the cam having the rounded groove guide surface are adopted when viewed from a left side.
Figure 19:
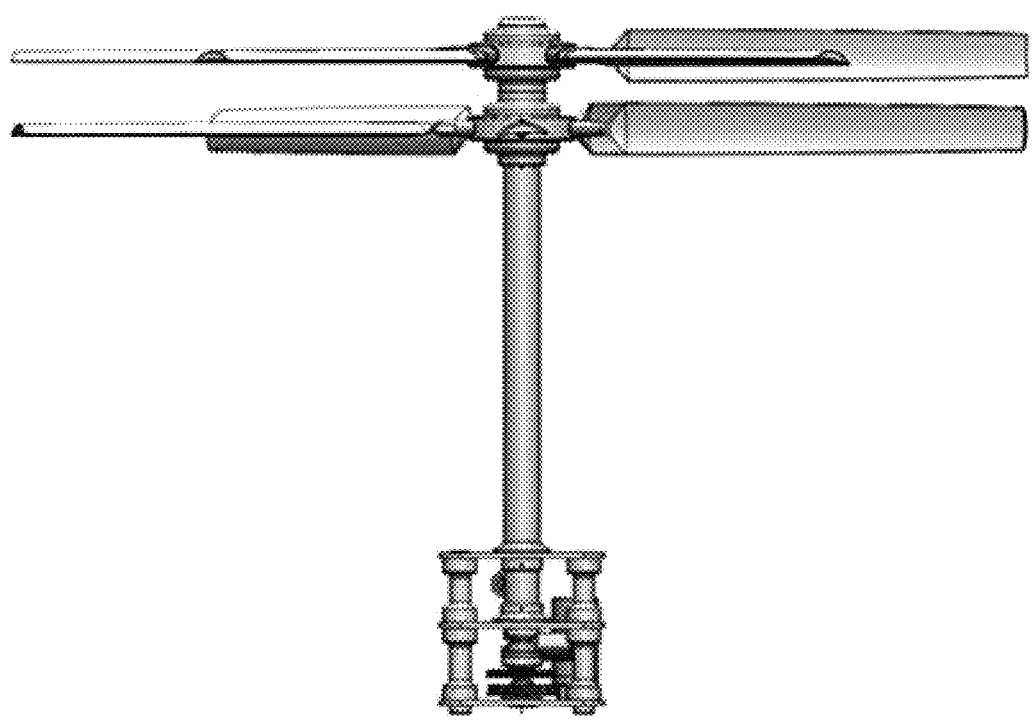
FIG. 19 is a view of a system in which the moving arm/fixed roller and the cam having the rounded groove guide surface are adopted when viewed from a right side.

FIG. 16 is a view of the system when viewed from a rear side after the system is completely assembled. Here, wind may flow from an 8 o'clock direction to 2 o'clock direction. FIG. 17 is a view of the system when viewed from a front side, FIG. 18 is a view of the system when viewed from a left side, and FIG. 19 is a view of the system when viewed from a right side.

Figure 20:
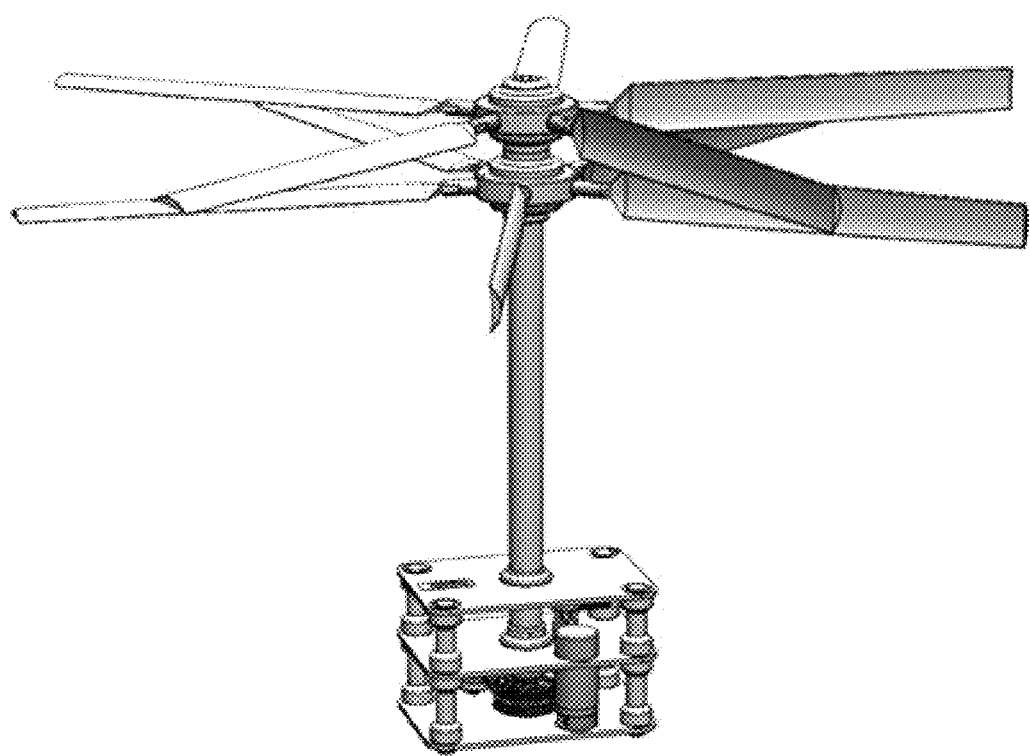
FIG. 20 is a view of a system in which the moving arm/fixed roller and the cam having the rounded groove guide surface are adopted when viewed from an upper side.
Figure 21:
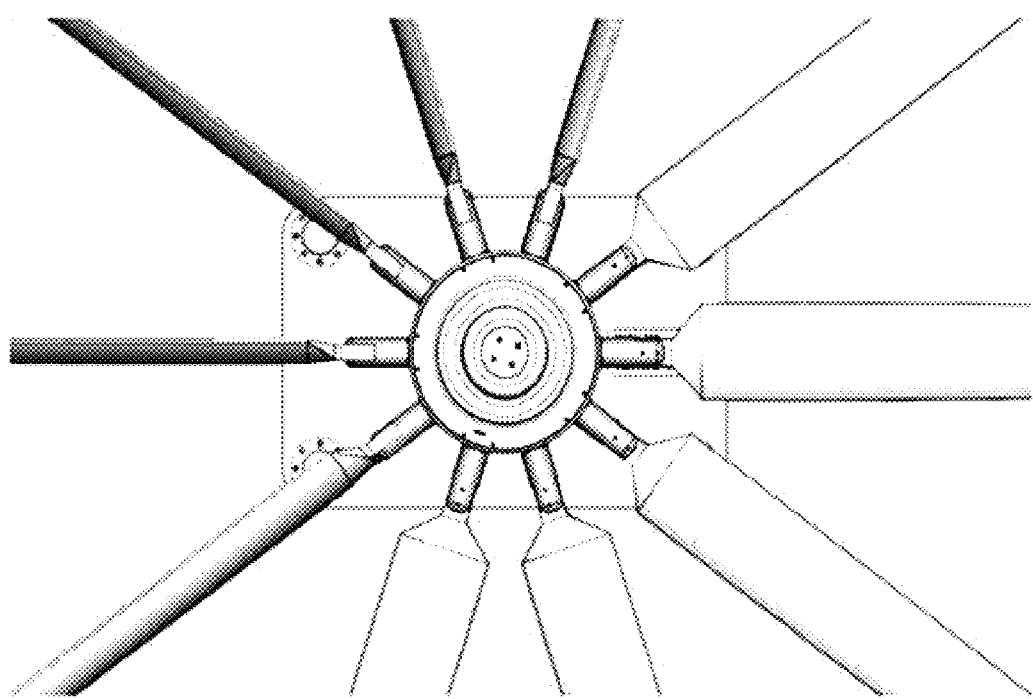
FIG. 21 is a view of ten blades of the dual drive layers system when viewed from an upper side.

FIG. 20 is a view of the system when viewed inclinedly from an upper side. FIG. 21 is a view of a blade group when viewed from a center of an upper side. Here, the multi-layers turbine may have a shape as if ten turbines are flush with each other because the upper and lower control system housings are twisted and coupled to each other at an angle of about 36 degrees.

Figure 22:
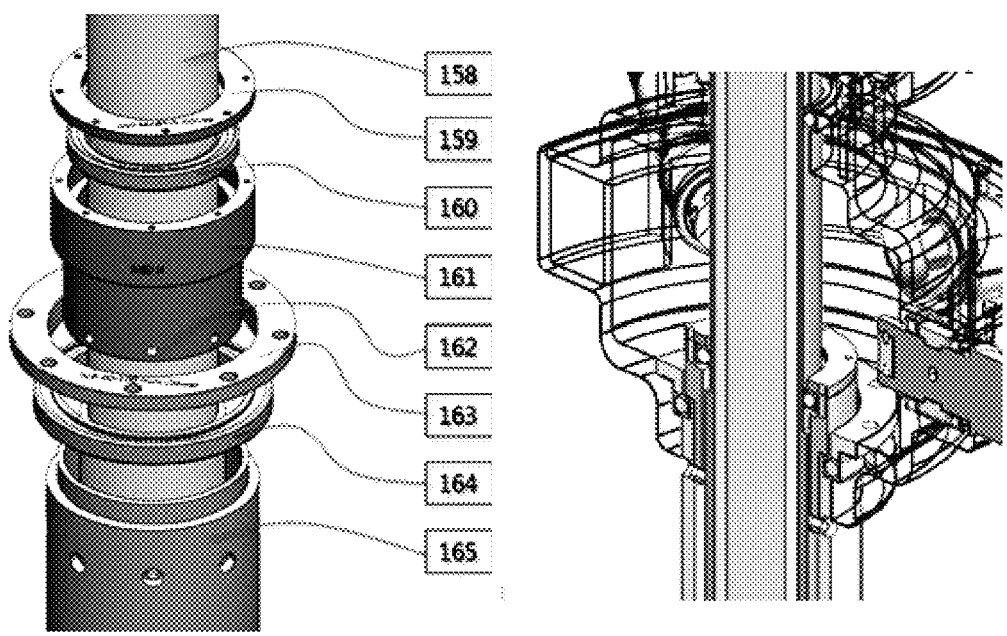
FIG. 22 is a view illustrating states before and after a main tower and a control axle are coupled to each other.

FIG. 22 is a view for explaining a connection portion for receiving a main tower 165 and a control axle 158. The control axle 158 may be designed to move by about 15 mm which is the sum of about 7 mm in an upward direction and about 8 mm in a downward direction. Also, the control axle 158 may intercept wind. A part 164 is a bearing rotated with a lower control system housing (see FIG. 10) and the main tower 163 therebetween, and a part 163 is a disk for fixing the bearing 164. A part 162 is coupled to eight screw grooves around the main tower 165. A part 162 is a necessary part for coupling two axles, i.e., coupling the main tower 165 to the control axle 158 using a bearing. A part 158 fixes a bearing within a bearing holder 161. Also, a right photograph of FIG. 22 illustrates a state in which the exploded parts in a left photograph of FIG. 22 are assembled with each other.

Figure 23:
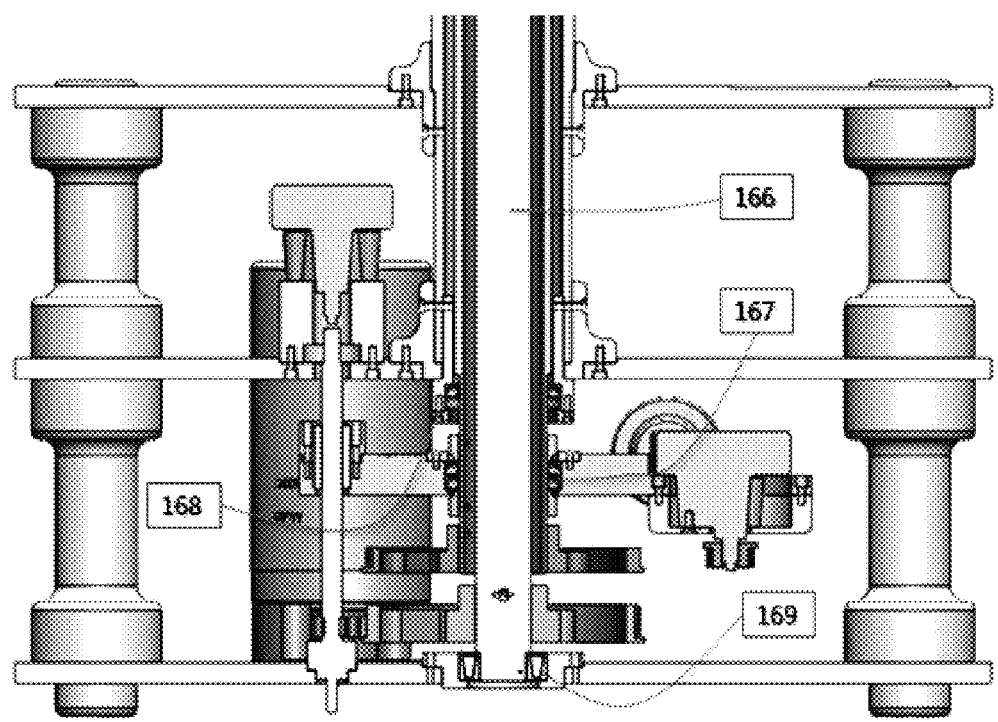
FIG. 23 is a cut-out view of a lower control section of the system, and herein two control worm gears are illustrated.

FIG. 23 is a cross-sectional view illustrating an operation state of a lower control system when wind flows in a horizontal direction. A drive axle 166 transmits a portion of a weight of an upper blade system into a trust bearing 169. A bearing 168 may have a self-slidable space within a predetermined range so that a control axle is vertically slidable. A part 167 is a bearing for supporting a transporter. Here, to endure a torsion, two bearing may be provided.

Figure 24:
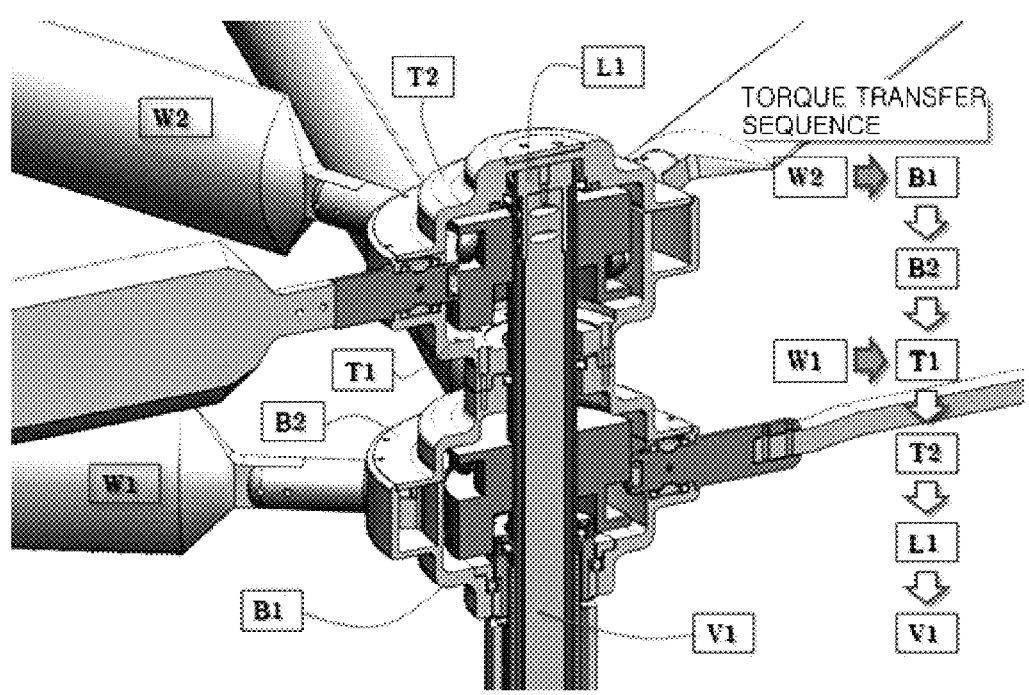
FIG. 24 is a view illustrating a process of transmitting a torque from the blade by cutting an upper portion of the system.

FIG. 24 illustrates a process for transmitting a driving torque into a generator. A reference symbol W1 represents five lower blades, and a reference symbol W2 represents five upper blades. The W1 is transferred into a reference symbol B2 that is a cover through a lower control system case B1, and the W2 that is a group of the upper blades is combined with a lower torque transmitted upwardly into a reference symbol T2 that is a cover through the T1 that is an upper control system case to transmit the lower torque into a reference symbol V1 that is a drive axle through a reference symbol L1 that is a link. A reason in which the above-described processes are necessary is because the torque should be transmitted to avoid the control axle that is not rotated.

Figure 25:
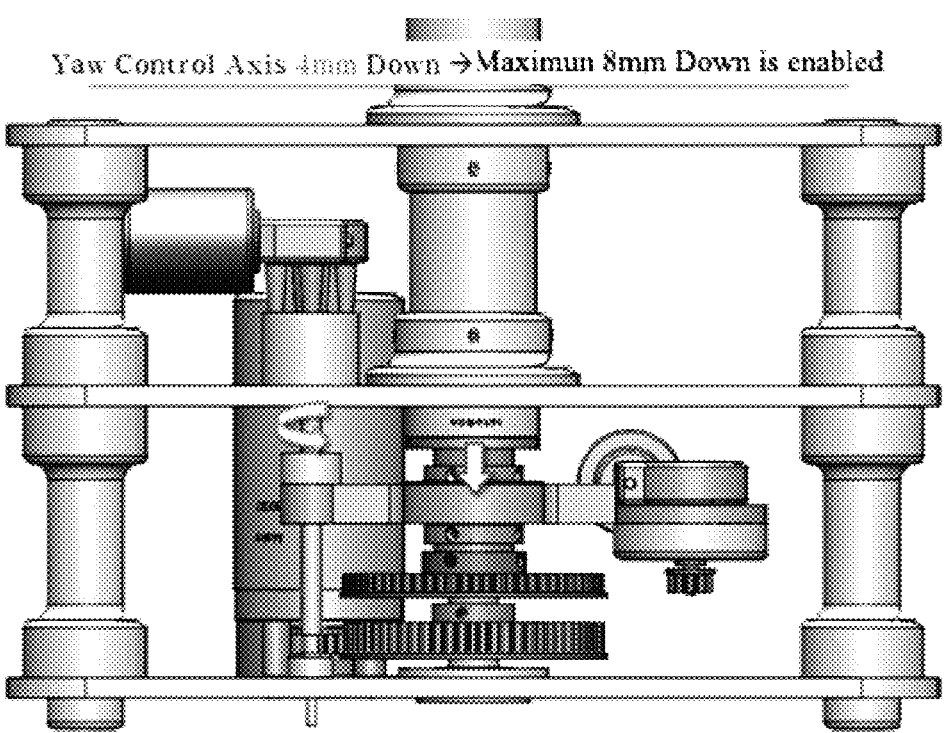
FIG. 25 is a view illustrating a state of movement when the control axle is moved downward to adjust an angle of the blade.
Figure 26:
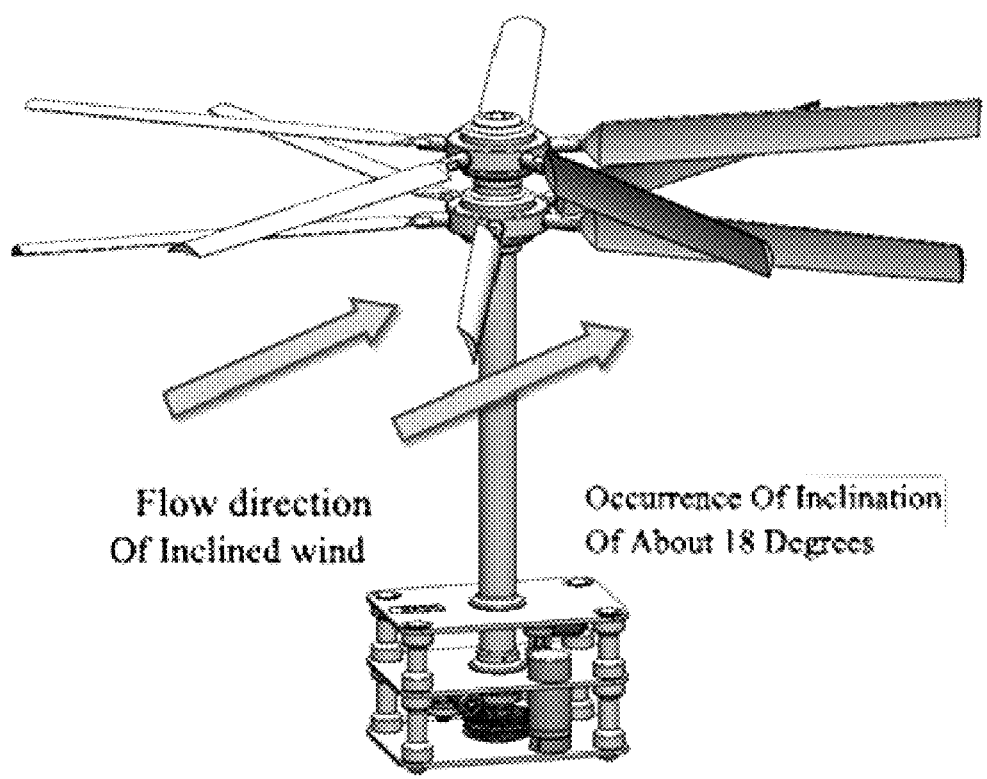
FIG. 26 is a view illustrating a state in which the blade is matched with a direction of wind flowing at a predetermined inclined angle when the control is executed in FIG. 25.
Figure 27:
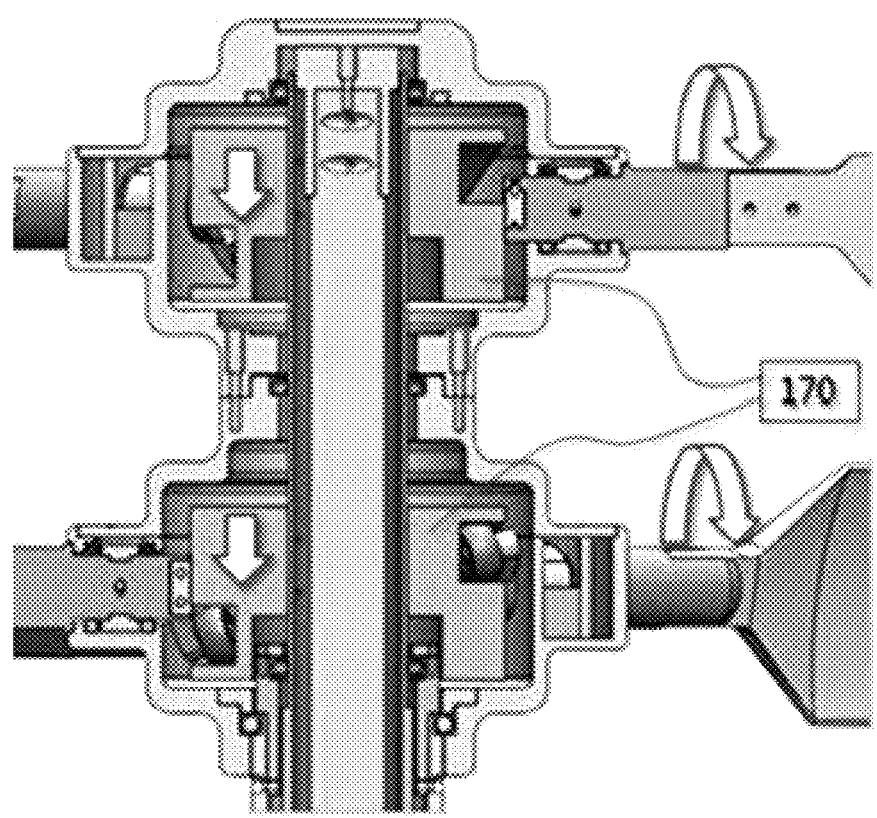
FIG. 27 is a view illustrating changes of position and angle of the blade of the cam within the upper dual layer blade control system when the control is executed in FIG. 25.

In FIG. 25, it is seen that a yaw angle is changed in position by using the control axle, but is not rotated. Here, it is seen that the yaw angle is moved by about 4 mm. In this operation, an upper warm motor may be used. As a result, in FIG. 26, it is seen that an inclined angle of about 18 degrees occurs downward at a position in which a blade intercepts wind. This condition may improve power generation efficiency by intercepting wind rising upward along an inclined plane in the most efficient method when the system is installed on the inclined ground. In FIG. 27, it is seen that a cam 170 is closely attached to the bottom of each lower control system case. As a result, a blade is bent at an angle corresponding to an attached degree of the cam 170.

Since the turbine blade according to the present invention is vertically rotated with respect to the main tower, the blade may not be bent toward the main tower even though typhoon or extreme wind is blown. Also, "the great volume of the blade" which can be provided to maintain the strength such as the windmill-type wing shape may be reduced, and the blade may be easy in design and manufacture. Thus, the production costs of the blade which occupy most of the production costs of the system may be reduced. Also, due to the high torque transition performance in structural mechanics of the blade, the blade may exert a greater driving force only with a size corresponding to a half of a maximum diameter of the wing-type blade which is manufactured today. Although the present invention is described with an emphasis on the vertical axis wind power generator, the present invention is not limited thereto. For example, the present invention may be a novel technology that can be applied to the horizontal axis wind power generator as well as wind power generators installed at various angles. In the case of the vertical axis wind power generator, the power generator may have more improved output efficiency even if the power generator has a height corresponding to that of half of a general wind power generator. Thus, the installation costs may be reduced. The best advantages of the horizontal axis wind power generator may be free installation and efficient disposition in a limited space in view of structural aspect of the main tower because a lower portion of the shaft of the turbine blade is free from the rotation space of the blade. Also, in a case where a group of horizontal axis wind power generators is installed, when the horizontal axis wind power generators are installed in a state where main towers are physically linked with each other, the horizontal axis wind power generators may well endure extreme wind than a general horizontal type wind power generator. Also, when the technology used in the present invention is utilized, since the plurality of multi-layer blade groups are installed on one generator driving shaft, each generator may produce several megawatts.

The present invention may be applied to a high-performance wind power generator using green energy without an occurrence of pollution. Also, since the wind power generator according to the present invention has performance greater than that of an existing windmill-type wind power generator, the wind power generator may lead the world market. Also, since the wind power generator is installed as a vertical axle, a high-rise main tower may not be required. Also, since the wind power generator has high efficiency, the wind power generator may have high output efficiency when compared to that of existing wind power generator under the same size. Thus, when the wind power generator is installed on the ground, destruction of the environment may be relatively less. Also, although it is impossible to install an existing large-scale wind power generator in the city, the 3D active intelligent turbine blade system according to the present invention may be installed on the rooftop of the Korean high-rise apartments. Therefore, since the massive tower is not needed, installation costs may be reduced. Also, a self-wind power generator may be installed on the existing apartment without expensive costs to create self-supply of electricity. Also, the bulb unit may have further improved efficiency. Also, since the wind power generator is provided as a vertical type and does not require a long main tower, the wind power generator may be mounted on a ship to electrically or mechanically transmit a power, thereby significantly reducing ship sailing costs. Also, the turbine may be installed into a multi-layered structure to improve an output per each unit area.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A vertical axle wind power generator, in which a positive torque is generated on a blade in a forward wind area, and a pitch angle is adjusted so that a drag of the blade is minimized in an adverse wind area, using a 3-dimensional (3D) active intelligent type turbine blade, the vertical axle wind power generator comprising:

one cylindrical cam of a first cylindrical cam having a flat traveling guide surface and a second cylindrical cam having a traveling guide surface in which a rounded groove is defined; and one cam follower of a first cam follower fixed to an arm fixed to the blade in a spherical roller shape, a second cam follower operated in the spherical roller shape with respect to a spline axle disposed on the arm fixed to the blade, and a third cam follower fixed to the arm movably hinge-coupled to the blade in the spherical roller shape, wherein since a roller of one of the cam followers travels along a traveling guide surface of one of the cylindrical cams in a state where the roller is closely attached to the traveling guide surface, when the roller of one of the cam followers travels along the traveling guide surface of one of the cylindrical cams, the blade performs a pitch movement a pitch motion for changing a rotation angle with respect to an axle of a length direction thereof, wherein, when the first cam follower travels along the traveling guide surface of the second cylindrical cam, the first cam follower is disposed so that an extension line of a central axle of the first cam follower passes through a center point of a drive axle always, when the second cam follower travels along the traveling guide surface of the second cylindrical cam, the second cam follower is connected operable with respect to the spline axle of the arm to receive the spline axle corresponding to a moved distance of the second cam follower with respect to the spline axle, or when the third cam follower travels along the traveling guide surface of the second cylindrical cam, the arm connected to the third cam follower is hinge-coupled to the axle in the length direction of the blade to receive the central axle of the arm corresponding to a changed angle of the central axle of the arm with respect to the axle of the length direction of the blade, wherein one of the first and second cylindrical cams and one of the first to third cam followers are respectively received into an upper control system housing and a lower control system housing, and in the upper and lower control system housings, a central portion of a side portion through which the blade axle protrudes has the lowest diameter, and each of upper and lower ends of the side portion has the lowest diameter.

2. The vertical axle wind power generator of claim 1, wherein a control axle coupled to the at least one cylindrical cam is installed within a main tower supporting the upper and lower control system housings, and the drive axle receiving a rotation driving force by the upper and lower control system housings is installed within the control axle, and the vertical axle wind power generator further comprises:
a generator receiving the driving force of the drive axle to generate electricity;
a lead screw receiving a rotation force of a first warm gear to vertically move the control axle using a transporter as a medium; and
a lower support device comprising a second warm gear motor installed on the transporter so that the second warm gear motor comprises a warm gear pulley linked with a pulley installed on a lower end of the control axle coupled to the cylindrical cam to adjust a yaw angle of the cylindrical cam to an angle of about 360 degrees, the lower support device supporting a lower portion of the main tower, wherein, when the first warm gear motor is forwardly/reversely rotated, the lead screw is forwardly/reversely rotated, and as the lead screw is forwardly/reversely rotated, the control axle is vertically moved using the transporter as the medium, and when the control axle is vertically moved, the one cylindrical cam coupled to the control axle is vertically moved together, and as the one cylindrical cam is vertically moved, the cam follower is linked with the cylindrical cam to pitch-rotate the blade.

3. The vertical axle wind power generator of claim 1, wherein two bearing are locked by two bearing lockers on a blade coupling part coupled to the blade, when the blade coupling part is installed in the upper and lower control system housings, portions at which the two bearings and the two bearing lockers are disposed on the blade coupling part are received within grooves defined in circumference directions of the upper and lower control system housings and protrusions protruding from covers of the upper and lower control system housings in the circumference directions to face the grooves, respectively, and at least two multi-layers constituting the blade overlap each other.

4. The vertical axle wind power generator of claim 2, wherein the control axle is bearing-supported by a bearing holder with respect to the main tower.

5. The vertical axle wind power generator of claim 1, wherein the blade has a crescent shape in section which is cut in a direction crossing the length direction of the blade, and the crescent shape is bisymmetrical with respect to a central axle of the cut surface.

* * * * *